United States Patent [19]

Stahl

[11] 3,965,273

[45] June 22, 1976

[54] DRY CARBONATION SOURCE AND METHOD FOR PREPARING THE SAME, AND DRY CARBONATED BEVERAGE CONCENTRATE

[75] Inventor: Howard D. Stahl, Hartsdale, N.Y.

[73] Assignee: General Foods Corporation, White Plains, N.Y.

[22] Filed: Apr. 2, 1973

[21] Appl. No.: 347,107

[52] U.S. Cl. .............................. 426/548; 426/97; 426/591
[51] Int. Cl.² ...................... A23L 1/22; A23L 2/02
[58] Field of Search ............. 426/96, 103, 147, 191, 426/366, 225, 103, 477, 591, 97, 548; 252/313 R, 310

[56] References Cited
UNITED STATES PATENTS

| | | | |
|---|---|---|---|
| 541,255 | 6/1895 | Wichmann | 426/191 |
| 1,450,865 | 4/1923 | Pelc | 426/225 |
| 1,654,099 | 12/1927 | Shiraishi | 252/313 R |
| 2,597,384 | 5/1952 | Sanders | 252/313 R |
| 2,603,569 | 7/1952 | Alther | 426/191 |
| 2,851,361 | 9/1958 | Diller | 426/91 |
| 3,667,962 | 6/1972 | Fritzberg et al. | 426/191 |

FOREIGN PATENTS OR APPLICATIONS

| | | | |
|---|---|---|---|
| 502,324 | 3/1939 | United Kingdom | 426/191 |

*Primary Examiner*—S. Leon Bashore
*Assistant Examiner*—Peter Chin
*Attorney, Agent, or Firm*—Thaddius J. Carvis; Daniel J. Donovan; Bruno P. Struzzi

[57] ABSTRACT

A dry carbonation source for preparing a carbonated beverage and a method for preparing the same, and a dry carbonated beverage concentrate are provided. The dry carbonation source is prepared by reducing the particle size of calcium carbonate in presence of an aqueous solution of a carbohydrate to form a colloidal suspension of calcium carbonate in the aqueous carbohydrate solution, and then drying this suspension to provide a solid suspension of finely-divided calcium carbonate dispersed within a matrix of the carbohydrate. This dry carbonation source is employed with other beverage ingredients to provide a dry carbonated beverage concentrate which readily dissolves to provide a carbonated beverage free from sediment.

15 Claims, 1 Drawing Figure

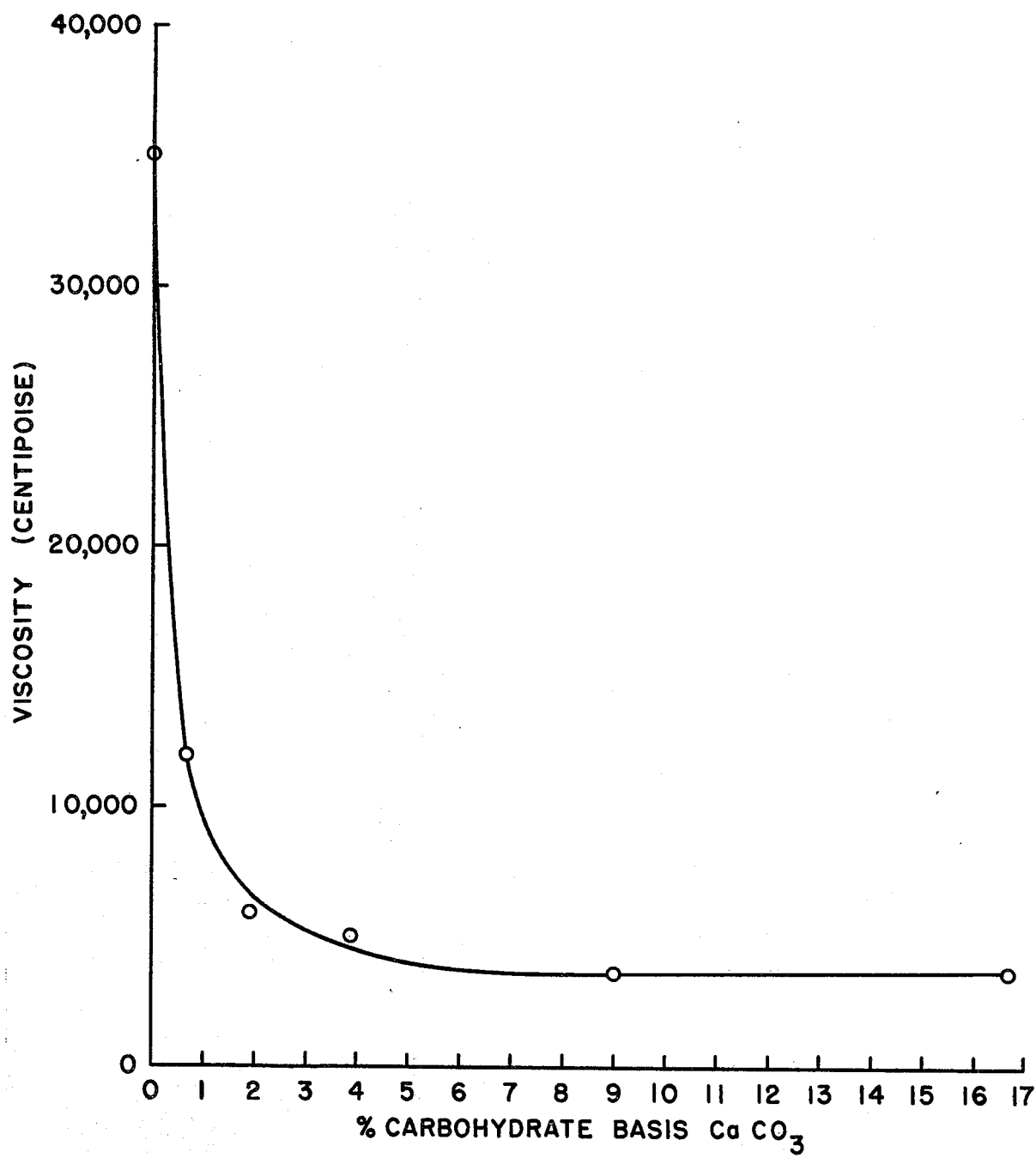

DRY CARBONATION SOURCE AND METHOD FOR PREPARING THE SAME, AND DRY CARBONATED BEVERAGE CONCENTRATE

BACKGROUND OF THE INVENTION

The present invention relates to carbonated beverages. More specifically, it relates to a dry carbonation source for use in preparing a carbonated beverage, the method for preparing this carbonation source, and a dry carbonated beverage concentrate.

The need for a dry carbonated beverage concentrate has existed for a long time. And, this need has been accentuated in recent years due to an increased awareness of the ecological limitations associated with canned and bottled carbonated beverages.

Early formulatory work on dry carbonated beverage concentrates predominantly utilized the carbonates and bicarbonates of sodium, potassium and ammonium as the sources of carbonation (e.g. Diller et al., U.S. Pat. No. 2,851,359). However, these carbonate sources are generally unacceptable when present in amounts sufficient to provide a desirable level of carbonation. Upon reaction with the acid in the beverage, whereby carbon dioxide is released, the corresponding sodium, ammonium and potassium salts are formed. The resultant, undesirable brackish taste can be alleviated to some degree by using a combination of these carbonates, but it generally persists thereby diminishing the palatability of the beverage.

The taste produced by the presence of calcium ions was found to be considerably more tolerable than that of the sodium or potassium ions. Accordingly, several workers have suggested employing calcium carbonate alone or in combination with other carbonates or bicarbonates to improve the palatability of carbonated beverages prepared from dry mixes (e.g. Diller et al. in U.S. Pat. Nos. 2,851,360 and 2,851,361, and Alther et al. in U.S. Pat. No. 2,603,569 and No. 2,639,238).

Calcium carbonate has not, however, been readily accepted. Because calcium carbonate is relatively insoluble, dry beverage concentrates employing it generally take excessively long periods of time to dissolve. Moreover, most commercial grades of calcium carbonate leave undesirable sediments when used in amounts sufficient to provide desirable levels of carbonation.

Carbon dioxide is released by a heterogeneous reaction between the calcium carbonate and the acid beverage solution. The reaction rate is dependent upon the exposed surface area of the calcium carbonate. The finest commercially available precipitated calcium carbonates have an average primary particle size of about 30 to 40 millimicrons. In reality, however, the primary particles are rarely present. In suspension, during preparation, the calcium carbonate particles tend to aggregate. These aggregates are only difficulty dissolved in the acid beverage solutions and cause a stubborn sediment. It has been found that even extensive and vigorous stirring does not effect solvation. Moreover, stirring must be kept to a minimum in intensity and duration so as not to evolve the $CO_2$ already in solution.

To be acceptable, a dry carbonated beverage concentrate must be conveniently dissolved in ice water and provide an appealing appearing beverage. An important factor relating to the convenience of the beverage concentrate is the time which it takes for the beverage mix to completely dissolve in ice water. In general, for consumer acceptance as a convenience product, the beverage mix should fully dissolve within about two minutes and preferably about one minute. For most flavors, the beverage will not be appealing in appearance unless all cloud and sediment disappears to provide a completely crystal clear beverage. For flavors such as orange, lemon and grapefruit, however, the presence of a slight cloud may be considered desirable. But in no case is the presence of any noticeable degree of sediment desirable.

SUMMARY OF THE INVENTION

Accordingly, it is an object of the present invention to provide a dry carbonation source and a method for preparing the same which will avoid many of the problems encountered by prior workers and provide a clear, carbonated beverage with no undesirable sediment or unsightly surface film when mixed with water in the presence of an acid.

It is a further object of the present invention to provide a dry carbonation source and a dry carbonated beverage concentrate which will rapidly and completely dissolve to provide a carbonated beverage.

It is another object of the present invention to provide a method for preparing a dry carbonation source which will rapidly and completely dissolve in water in the presence of an acid to provide a carbonated beverage.

A still further object of the present invention is to provide a dry carbonation source and a dry carbonated beverage concentrate capable of providing a carbonated beverage free from any brackish taste or sediment, but yielding a desirably high level of carbonation within an acceptably short period of time.

It is yet another object of the present invention to provide a method of preparing a dry carbonation source capable of providing a carbonated beverage free from any brackish taste or sediment, but yielding a desirably high level of carbonation within an acceptably short period of time.

A further object of the present invention is to provide a dry carbonation source and a dry carbonated beverage concentrate which are inexpensive, yet provide desirable levels of carbonation in a carbonated beverage free of any brackish taste, and which dissolve completely within acceptably short periods of time.

It is yet another object of the present invention to provide a method of preparing a dry carbonation source which is inexpensive, yet provides a desirable level of carbonation in a carbonated beverage free from any brackish taste, and which dissolves completely within an acceptably short period of time.

These and other objects are accomplished according to the present invention which provides a dry carbonation source and a method for preparing the same, and a dry carbonated beverage concentrate. The dry carbonation source of the present invention is prepared by reducing the particle size of calcium carbonate in the presence of an aqueous solution of a carbohydrate, to form a colloidal suspension of the calcium carbonate in the aqueous solution; and then drying the colloidal suspension to provide a solid suspension of finely-divided calcium carbonate dispersed within a matrix of the carbohydrate. An acid and other known beverage ingredients can be employed with the dry carbonation source to provide a ready-to-use dry carbonated beverage concentrate which can be rapidly dissolved in water to provide a clear, carbonated beverage free of sediment.

DETAILED DESCRIPTION OF THE INVENTION

The present invention will become more apparent in light of the ensuing discussion, especially when viewed in conjunction with the attached drawing which is a graphic representation showing the variation in the viscosity of a calcium carbonate slurry due to the addition of a carbohydrate.

For a given sample of calcium carbonate, one would expect the rate of solvation to increase and the amount of undissolved calcium carbonate to decrease with decreasing particle size. This is based upon assumption that because the smaller particles possess larger surface areas and presumably greater dispersability, they should facilitate more effective participation in the heterogenous carbonating reaction. I have observed, however, that irrespective of the degree to which the calcium carbonate may be ground or milled, the primary particles of the calcium carbonate tend to aggregate into difficulty-dissolvable particles. This results in a high percentage of undissolved calcium carbonate particles, known as sinkers.

It is extremely difficult to obtain finely-divided calcium carbonate having uniformly small particles of less than about 100 millimicrons. The primary particles within this size range form difficulty dissolvable aggregates which remain as sediment in the final beverage. It is presently believed that this aggregation is due to the presence of intense attractive forces on the individual particles.

I have discovered according to the present invention that it is possible to obtain finely-divided calcium carbonate particles which readily dissolve in dilutely-acid, aqueous solutions to give a crystal clear liquid with substantially no sediment. This is accomplished by reducing the particle size of the calcium carbonate in the presence of an aqueous solution of a carbohydrate to form a colloidal suspension of calcium carbonate in the aqueous carbohydrate solution, and then drying the suspension to provide a solid suspension of finely-divided calcium carbonate dispersed within a matrix of the carbohydrate. Preferably, the aggregates of calcium carbonate are reduced to a range approaching the average primary particle size of less than about 100, and more preferably less than about 40, millimicrons and substantially freed of aggregates in excess of about 10 microns, and more preferably 1 micron.

It is presently believed that the carbohydrate in solution reduces the attractive forces on the calcium carbonate particles to such extent that aggregation is retarded, and possible, that deaggregation is in fact encouraged. In any event, the results obtainable according to the present invention are real and reproduceable, and I do not wish to be bound by any particular theory.

The graph in the drawing is intended to illustrate the effect of the carbohydrate on the attractive forces on the particles of calcium carbonate in an aqueous slurry. The particular carbohydrate employed here was Mor-Rex 1918 10 DE hydrolyzed cereal solids, and the calcium carbonate was Purecal U available from Wyandotte. Viscosity was measured versus rpm, using a Brookfield Syncrolectric viscometer. In each case, the calcium carbonate was milled in a colloid mill and its viscosity measured. The colloidal suspension was then admixed with the carbohydrate and its viscosity again measured. This procedure was repeated for several samples while varying the amount of carbohydrate from 0% to about 17% by weight based on the weight of the calcium carbonate. Even amounts as low as 0.65% sharply decreased the viscosity of the colloidal suspension, thereby indicating that the shear-resisting, attractive forces originally present had been reduced. As indicated in the drawing, the viscosity of the calcium carbonate slurry, and, therefore, the attractive forces on the calcium carbonate particles and the attendant problem of aggregation, dropped quite rapidly up to a concentration of about 9% of the carbohydrate based on the weight of the calcium carbonate.

The relative amounts of the uniformly divided calcium carbonate and the carbohydrate matrix are not presently believed to be critical to the present invention. The lower limit of carbohydrate would be that amount sufficient to inhibit the formation of agglomerates in the calcium carbonate. As a guideline to an upper limit, the carbohydrate should not be present in such great amounts that the time for solution of the carbonation system becomes excessively prolonged. From the drawing it appears that concentrations above about 9% carbohydrate are particularly effective. In practice, carbohydrate to calcium carbonate ratios of from about 1:20 to 20:1, and more preferably from about 1:10 to 3:1, are effective.

The particular crystalline form of the calcium carbonate is not critical to the present invention, but may be any of those commercially available. Finely-divided, precipitated calcite having an average primary particle size of less than about 100, preferably less than about 40, millimicrons has been found to be desirable. This form of calcium carbonate is commercially available as Purecal U from Wyandotte Corp.

Preferably, the aggregates of calcium carbonate are capable of being reduced to a range approaching the average primary particle size of less than about 100, and more preferably less than about 40, millimicrons and substantially freed of aggregates in excess of about 10 microns, and more preferably 1 micron. It will be obvious to those skilled in the art that the calcium carbonate may be supplied as an essentially dry powder obtainable from commercial sources or that it can be supplied directly after formation as a wet filter cake. The degree of moisture is not presently believed critical, as the method of the present invention prevents the formation of undesirable sediments in the final beverage regardless of the moisture content of the calcium carbonate starting material.

Any carbohydrate having the capability of being dried efficiently can be used according to the present invention. Representative of carbohydrates which can be employed according to the present invention are low DE corn syrups, sucrose, hydrolyzed cereal solids, lactose, mannitol, gum arabic and the like. A 10 DE hydrolyzed cereal solids available commercially as Mor-Rex 1918 from Corn Products Corporation has been found to be particularly suitable. Gum arabic also functions well according to the present invention and provides a thick foam upon solution in water. Thus, the gum arabic is particularly suitable for preparing dry carbonation sources for beverages such as root beer where a degree of foam is desired.

Any means capable of reducing the particle size of the calcium carbonate to a desired size level is sufficient. During the reduction operation, the colloidal suspension will comprise from about 1 to 40% calcium carbonate based on the weight of the suspension. Typically, a colloid mill or other such high shear device can be employed. The main requirement for selection of such a device is its ability to uniformly reduce the particle size to the desired size range leaving a minimum of large aggregates present in the resultant colloidal suspension.

The manner of drying the colloidal suspension to form the solid suspension is not critical, but can be performed by any suitable, known technique. Preferably the colloidal suspension is dried to a moisture content of less than about 2%. Typically, it can be spray dried, drum dried or freeze dried. Spray drying is preferred and can be accomplished in a spray dryer such as a Niro dryer at 175° – 190°C. For drum drying, a double drum dryer heated with about 80 lbs. steam pressure (162°C) can be employed. Preferably the solid suspension is ground or milled by suitable means to an average particle size of less than about 50 microns.

The dry carbonation source according to the present invention is readily employed with other known beverage ingredients to provide a readily dissolvable dry carbonated beverage concentrate.

Typically such a beverage concentrate will include sufficient amounts of a non-toxic acid such as citric, malic, fumaric or other like acid, to provide a pH in the final beverage of from about 4.5 to about 5.2. The acid is therefore employed in an amount of from about 1% to 20%, and preferably 1% to 10%, in excess of the amount theoretically required to completely evolve the carbon dioxide from the dry carbonation source of the present invention and any supplemental carbonation source present in the beverage.

The carbonation source of the present invention can be employed without any additional carbonation producing material at concentrations up to about 0.3 weight percent in the beverage without any noticeable brackish taste. However, the carbonation source of the present invention is preferably employed in amounts sufficient to obtain a calcium ion concentration in the final beverage of from about 0.15 to 0.26%, in combination with a supplemental carbonation producing source such as sodium carbonate, sodium bicarbonate, potassium carbonate, potassium bicarbonate, ammonium carbonate, ammonium bicarbonate, or any combination thereof, which is employed in an amount sufficient to bring the carbonation to the desired level of greater than about 1.0, and preferably greater than about 1.6, volumes of carbon dioxide gas per volume of final beverage.

Also, conventional flavorants such as cherry, strawberry, grape, orange, lemon, lime, root beer, cola, raspberry and the like can be employed in suitably effective amounts.

Additionally, the dry carbonated beverage concentrate should employ a sweetening agent. Generally, any of the known, non-toxic natural or synthetic sweeteners can be employed. Of the natural sweeteners, sucrose is preferred; however, other sugars such as fructose, dextrose, etc.; certain amino acids such as L-alanine and glycine; certain alcohols such as sorbitol, mannitol and xylitol; vegetable extracts such as glycyrrhiza globra; and the like can be employed. Exemplary of the synthetic sweeteners which can be employed are saccharin, cyclamate salts, and certain dipeptides and their salts such as L-aspartyl-L-phenylalanine methyl ester, and the like.

The sweeteners and flavorants can be incorporated in the dry carbonated beverage source at any suitable stage in the procedure. For example, the sweeteners and/or flavorants can be added to the suspension of calcium carbonate and carbohydrate before or after reducing the particle size and before drying thereof. In this manner, the sweeteners and flavorants are incorporated within the carbohydrate matrix and problems relating to mixing and handling fine powders and alleviated to some degree. Alternatively, the sweeteners and/or flavorants can be dry blended with the dry carbonation source simultaneously or sequentially with regard to the addition of the acid.

Those skilled in the art will be aware of the desired amounts of the various sweetening and flavoring agents which can be employed alone or in combination. It will further be obvious to those of ordinary skill in the art that where the carbohydrate itself has a sweetening effect, the need for another sweetening agent will be decreased or possibly eliminated depending upon the amount of the carbohydrate present in the concentrate.

A typical dry carbonated beverage concentrate according to the present invention can have the following formulation on a dry basis:

6.16% by weight of the carbonation source of the present invention (e.g., 50% carbohydrate),
6.06% malic acid,
1.80% sodium bicarbonate,
85.80% sucrose,
0.15% orange flavorant, and
0.03% lemon flavorant.

To prepare a single serving of beverage, approximately 28 grams of this concentrate are added to approximately 6 ounces of water. techniques Because the calcium carbonate and the acid react in the presence of moisture to release carbon dioxide gas, it is important to maintain the dry carbonated beverage concentrate of the present invention at relatively low moisture levels. The exact upper limit of the moisture content is not presently considered critical, because this limit will vary with the intended modes of storage and use. However, it has been found desirable to maintain the moisture at no greater than about 2.0%, and preferably no greater than about 0.2%, based on the weight of the dry ingredients. Those skilled in the art will be aware of the most suitable technique for achieving and maintaining the desired moisture content.

For optimum storage stability, the dry carbonation source and dry carbonated beverage concentrate of the present invention should be stored in moisture impermeable containers. Typically, a sealed envelope of metal foil, a moisture impervious film of a vinyl chloride or vinylidene chloride polymer or copolymer, or a combination thereof, will provide good protection. It is of course an added advantage of the present invention that the carbohydrate matrix inhibits intimate physical contact between the calcium carbonate and the acid, thereby increasing the storage stability of the product.

The following examples are presented for the purpose of further illustrating and explaining the present invention and are not to be taken as limiting in any sense. Unless otherwise indicated, all parts and percentages are by weight.

EXAMPLE 1

This example illustrates the preparation of a dry carbonation source and a dry carbonated beverage concentrate according to the present invention.

A. The following ingredients were added in the indicated amounts to an Eppenbach colloid mill and recycled at the widest gap until thoroughly mixed:

145.0 g Purecal U calcium carbonate (average primary particle size of 33 to 40 millimicrons),
5.0 g gum arabic,
150.0 g Mor-Rex 1918 10 DE hydrolyzed cereal solids, and
100.0 g water.

The colloid mill gap was then set to No. 4 and the mixture was recycled for five minutes to produce a milky dispersion of calcium carbonate. This dispersion was spray dried in a Niro dryer at an inlet temperature of 175°C. The resulting dry powder was passed through a 140 mesh screen to remove large agglomerants and contaminants. The sample was then ground in a Mikro-Samplmill hammermill (Slick Corporation) with a 0.01 herringbone slot retaining screen insert and passed through a 400 mesh screen (0.038 mm) to obtain a dry carbonation source according to the present invention.

B. The above-prepared, dry carbonation source and the other following ingredients were dry blended in the indicated proportions:

1.38 g of the dry carbonation source,
1.16 g coarse malic acid (Palamus brand),
0.28 g sodium bicarbonate,
12.5 g sucrose (Baker's Special), and
1.2 mg of an anti-foam emulsion.

The resultant dry carbonated beverage concentrate was then admixed with 100 ml of ice cold water in a 150 ml beaker. The beverage was acceptably clear after 1 minute and 15 seconds and was crystal clear after about 2 minutes. No unreacted sediment was found.

EXAMPLE 2

Another exemplary dry carbonation source and dry carbonated beverage concentrate employing it are prepared according to the present invention.

A. Purecal U calcium carbonate (150 g), Mor-Rex 1918 10 DE hydrolyzed cereal solids (150 g), and water (600 ml) were added to an Eppenbach colloid mill and treated as in Example 1. The colloidal dispersion of calcium carbonate was stable enough to spray dry without any settling of the carbonate. The dried powder was passed through a 140 mesh screen to remove contaminants. The powder was then ground in a Waring Blender at high speed for 5 minutes. The resultant material was screened at 400 mesh (38 microns) to provide a dry carbonation source according to the present invention.

B. The carbonation source prepared in part A above was dry blended with the other following ingredients in the amounts indicated:

1.28 g of the carbonation source,
1.12 g malic acid,
0.28 g sodium bicarbonate, and
12.5 g sucrose.

The resultant dry carbonated beverage concentrate was then admixed with 100 ml of ice cold water in a 150 ml beaker. The beverage was acceptably clear after about one minute fifteen seconds and crystal clear after about two minutes. No unreacted sediment was found.

EXAMPLE 3

As a comparison, untreated Purecal U calcium carbonate from the same lot as that employed in Examples 1 and 2 above was used to prepare a beverage. The following ingredients were dry blended in the indicated amounts:

0.64 g Purecal U calcium carbonate,
1.1 g malic acid,
0.28 g sodium bicarbonate, and
12.5 g sucrose The resultant dry blend is admixed in a 150 ml beaker and 100 ml of cold water is added thereto and mixed. The beverage cleared at about the same rate as the beverages prepared in Examples 1 and 2 but contained a very noticeable amount of unreacted sediment.

EXAMPLES 4 – 12

The following examples quantitatively illustrate the effect of employing a carbohydrate in preparing a dry carbonation source for a dry carbonated beverage concentrate. In each example the dry carbonation source was prepared following the procedure outlined in Example 2, except that varying relative amounts of carbohydrate and calcium carbonate were employed. The dry carbonation sources were then employed in dry carbonated beverage concentrates following the procedure outlined in Example 2, except that the amount of the dry carbonation source was varied to provide the same amount of calcium carbonate in each case as was employed in Example 2. For each sample, a beverage was prepared in the same manner as in Example 2. The results of the Examples 4 through 12 are summarized in Table 1.

Many modifications and variations of the present invention will be apparent to those skilled in the art upon reading the above specification. All of these modifications and variations are intended to be included within the scope of the present invention which is defined by the following claims.

| Example | Calcium Carbonate Initial primary particle size ($\mu$) | wt.% | Carbohydrate type | wt.% | Beverage Clearing Time (min.) | Sediment (wt. %) |
|---|---|---|---|---|---|---|
| 4 | 0.033–0.040 | 100 | — | 0 | 2.25 | 0.44% |
| 5 | 0.033–0.040 | 90 | 10 D.E. hydrolyzed Cereal Solids | 10 | 2.25 | none |
| 6 | 0.033–0.040 | 75 | 10 D.E. hydrolyzed Cereal Solids | 25 | 1.50 | none |
| 7 | 0.033–0.040 | 50 | 10 D.E. hydrolyzed Cereal Solids | 50 | 1.50 | none |
| 8 | 0.033–0.040 | 25 | 10 D.E. hydrolyzed Cereal Solids | 75 | 1.50 | none |
| 9 | 0.033–0.040 | 50 | Mannitol | 50 | 1.58 | none |
| 10 | 0.033–0.040 | 50 | Lactose | 50 | 1.67 | none |
| 11 | 0.033–0.040 | 50 | Gum arabic | 50 | 2.00 | none |
| 12 | 0.10 | 50 | 10 D.E. hydrolyzed | 50 | 2.67 | none |

| Example | Calcium Carbonate Initial primary particle size (μ) | wt.% | Carbohydrate type | wt.% | Beverage Clearing Time (min.) | Sediment (wt. %) |
|---------|---|---|---|---|---|---|
| | | | Cereal Solids | | | |

What is claimed is:

1. A dry carbonated beverage concentrate for preparing a carbonated beverage comprising:
   a. a dry carbonation source which comprises a solid suspension of finely-divided calcium carbonate dispersed within a matrix of a water-soluble carbohydrate wherein the calcium carbonate has an average primary particle size of less than about 100 millimicrons and is substantially free from agregates in excess of about 10 microns,
   b. a dry non-toxic acid, and
   c. a flavorant.

2. A dry carbonated beverage concentrate according to claim 1 wherein the average primary particle size of the calcium carbonate is less than about 40 millimicrons.

3. A dry carbonation source according to claim 1 wherein the solid suspension is divided into particles having an average diameter of less than about 50 microns.

4. A dry carbonated beverage concentrate according to claim 1 wherein the calcium carbonate is substantially free from aggregates in excess of 1 micron.

5. A dry carbonated beverage concentrate according to claim 1 which further comprises:
   d. a sweetener.

6. A dry carbonated beverage concentrate according to claim 5 wherein at least a portion of the sweetener is incorporated within the matrix of carbohydrate.

7. A dry carbonated beverage concentrate according to claim 5 wherein the sweetener comprises sucrose.

8. A dry carbonated beverage concentrate according to claim 5 wherein the sweetener comprises L-aspartyl-L-phenylalanine methyl ester.

9. A dry carbonated beverage concentrate according to claim 5 which further comrises:
   e. a supplemental carbonation source.

10. A dry carbonated beverage concentrate according to claim 9 wherein the acid is present in an amount of from about 1 to 20% in excess of the amount theoretically required to release all of the carbon dioxide from the calcium carbonate and the supplemental carbonation source into solution upon solvation in water.

11. A dry carbonated beverage concentrate according to claim 10 wherein the acid is present in an amount of from about 1 to 10% in excess of the amount theoretically required to release all of the carbon dioxide from the calcium carbonate and the supplemental carbonation source into solution upon solvation in water.

12. A dry carbonated beverage concentrate according to claim 10 wherein the supplemental carbonation source comprises a sodium, potassium or ammonium carbonate or bicarbonate or any combination thereof.

13. A dry carbonated beverage concentrate according to claim 10 wherein at least a portion of the sweetener is incorporated within the matrix of carbohydrate.

14. A dry carbonated beverage concentrate according to claim 10 wherein the sweetener comprises sucrose.

15. A dry carbonated beverage concentrate according to claim 10 wherein the sweetener comprises L-aspartyl-L-phenylalanine methyl ester.

* * * * *